May 17, 1927.  
E. CANTONO  
1,629,378  
SHOCK PREVENTING DEVICE FOR VEHICLES  
Filed July 7, 1925   3 Sheets-Sheet 1

Inventor  
Eugenio Cantono  
By Marks & Clerk  
Attorneys

May 17, 1927. 1,629,378
E. CANTONO
SHOCK PREVENTING DEVICE FOR VEHICLES
Filed July 7, 1925   3 Sheets-Sheet 2

Inventor
Eugenio Cantono
By Marks & Clerk
Attorneys

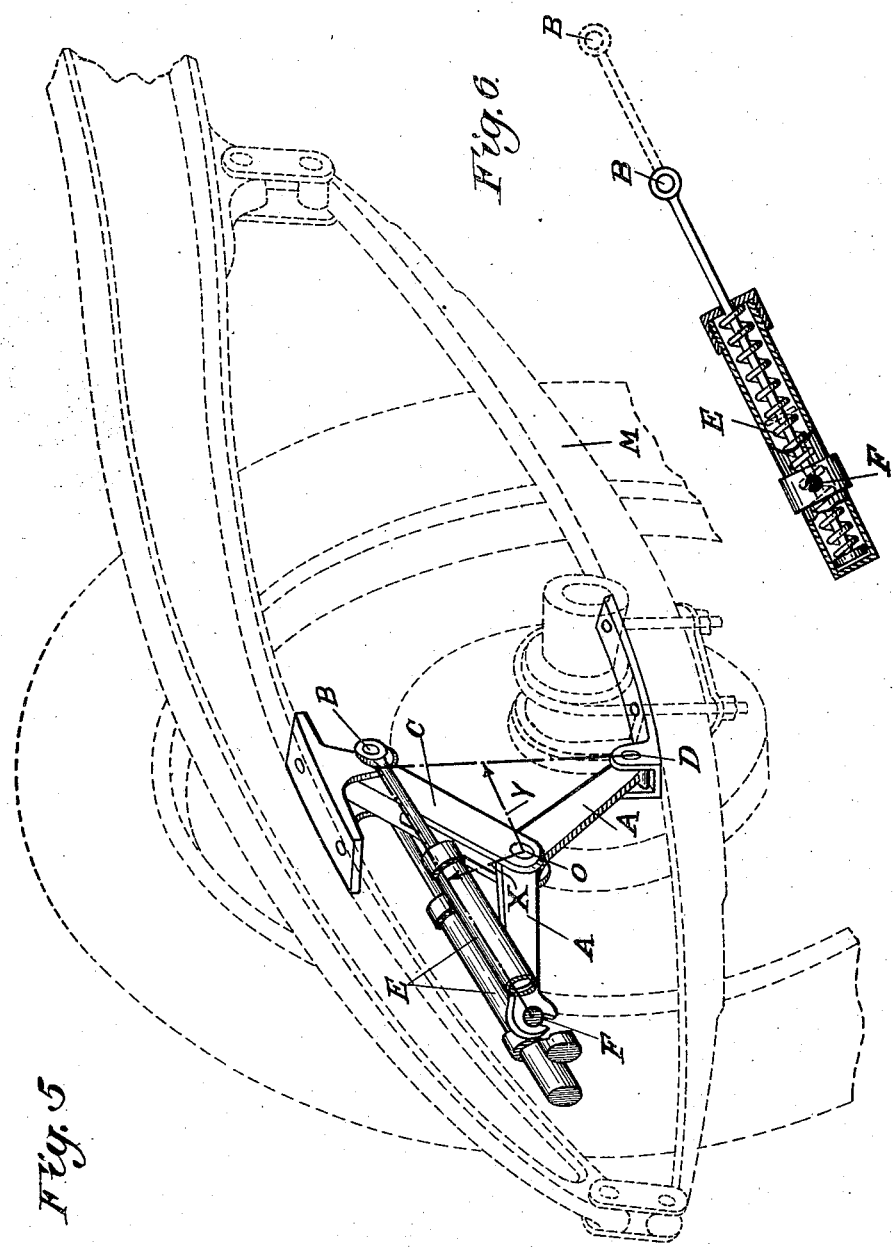

Patented May 17, 1927.

1,629,378

UNITED STATES PATENT OFFICE.

EUGENIO CANTONO, OF ROME, ITALY.

SHOCK-PREVENTING DEVICE FOR VEHICLES.

Application filed July 7, 1925, Serial No. 42,077, and in Italy July 29, 1924.

In every semi-elliptic suspension device for vehicles it happens that the semi-elliptic supports the vehicle differently relative to the axle, owing to variations of road, moving towards or from the frame of the vehicle. These variations of the supporting effort produce shocks.

In order to cushion or brake these shocks a great number of "cushioning devices" have been proposed, with a view of keeping the movements of the vehicle within reasonable limits.

The results obtained with the said cushioning devices are the better the more powerful is the braking action. This action however is produced at the cost of smoothness of movement causing the persons riding on the vehicle great discomfort, besides which none of the cushioning devices hitherto proposed correspond fully to the purpose.

Instead of cushioning or braking the shocks, applicant by his new device prevents them from being produced, with the result that persons riding on uneven streets do not receive shocks.

According to my invention between the semi-ellipsed springs and the frame of the vehicle a spring and lever device is inserted which produces between the axle and the frame a supporting force which, contrarily to the effect of semi-ellipsed springs, is increased as the axle moves away from the frame, and decreases as the axle moves towards the frame. This new device is so calculated that to every decrease of the supporting force of the C-springs corresponds an increase of the supporting force of the spring and lever device, and vice versa to every increase of the supporting force of the C-springs corresponds a decrease of the supporting force of the spring and lever device, so that the vehicle is automatically supported by a force which is not varied by the unevenness of the road, and therefore is not subjected to shocks generated by the said unevenness.

In order that my invention may be more clearly understood I am now going to described same with the aid of the annexed drawings in which—

Figure 5 is a perspective view of the spring and lever arrangement shown in Figs. 3 and 4.

Fig. 6 is a detail view of the coil spring used in conjunction with the levers.

Figure 1:
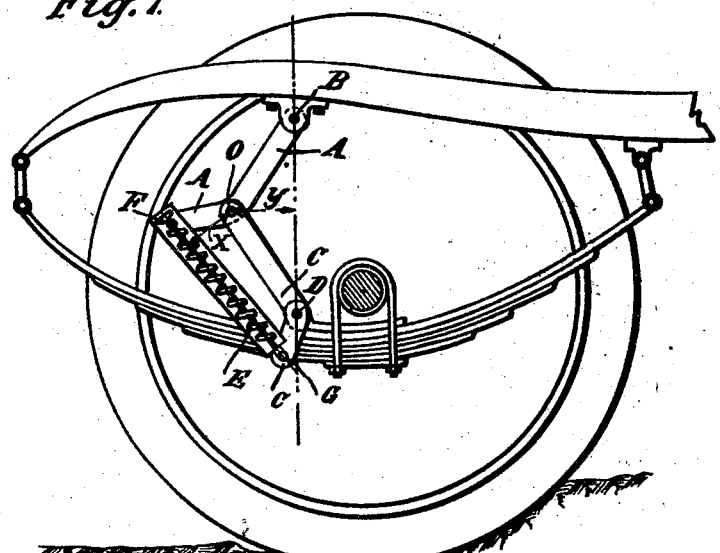
Fig. 1 is a side view of my device in expanded condition with the vehicle wheel entering in a depression of the road.
Figure 2:
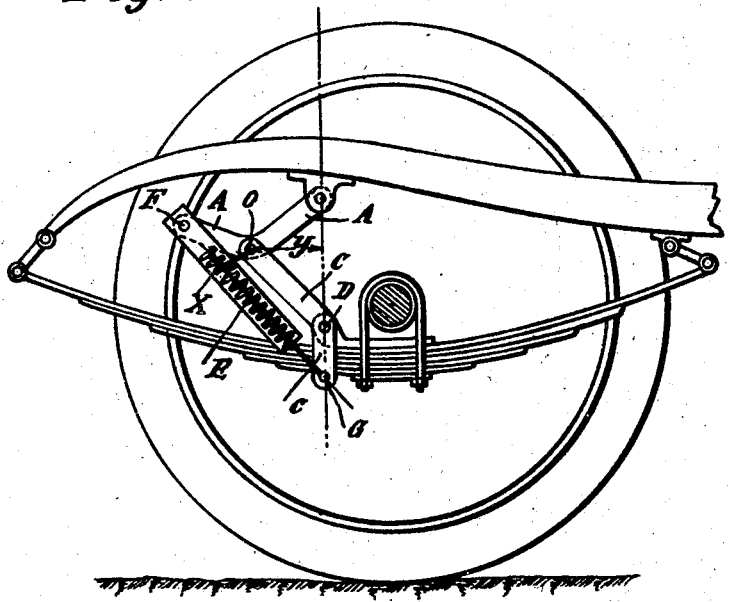
Fig. 2 is a similar view of same in normal condition, with the vehicle running on even road, and Figs. 3 and 4 corresponding views of a modification of the same invention.

In the said Figures 1 and 2 A—A is a double lever pivoted at B to the frame of the vehicle, whilst at the meeting point of its two arms the lever is pivoted to a double lever C—C pivotally mounted at D on the axle of the vehicle.

The free ends of the said levers A—A and C—C are connected together by a coil spring E which by expansion tends to rotate said levers on their common pivot O thus tending to increase the space between the pivots B and D apart thereby opposing their moving towards each other under the weight of the vehicle acting in opposite direction to that of coil spring E.

From Fig. 1 it is seen that moment arm X of spring E with respect to pivot O has a length approximately equal to the moment arm Y of the weight of the vehicle with respect to said pivot O. If therefor a supporting force between B and D, that is between axle and frame, is to be produced, such as for instance 200 kg. in addition to the suspending force of the laminated springs when the wheel drops into a hole or cavity of the road if such is the force they have lost, it will be sufficient to insert between points F and G a coil spring tending to expand with a force of 200 kg., as the acting arms of force in play are equal.

It will be seen from Fig. 2 that on the one hand the compression of coil spring E is slightly increased, but on the other hand its moment arm of action X is greatly decreased, and vice versa the moment arm of action Y of the weight of the vehicle with respect to the common pivot O of levers A and C is greatly increased.

Owing to this the increase of compression of coil spring E not only becomes absolutely insufficient for producing between B and D, that is between axle and frame, the above said force of 200 kg., but it only produces a force equal to the ratio $\frac{X}{Y}$ of the lever arms multiplied with the force of the coil spring.

In compensation, in the said position, the semi-elliptic springs exert an increased supporting effect which being flattened by the axle moving towards the frame of the wheel leaving the depression of the road and produce a reaction sufficient for supporting the weight of the vehicle and need decreased assistance from the levers.

Figure 3:
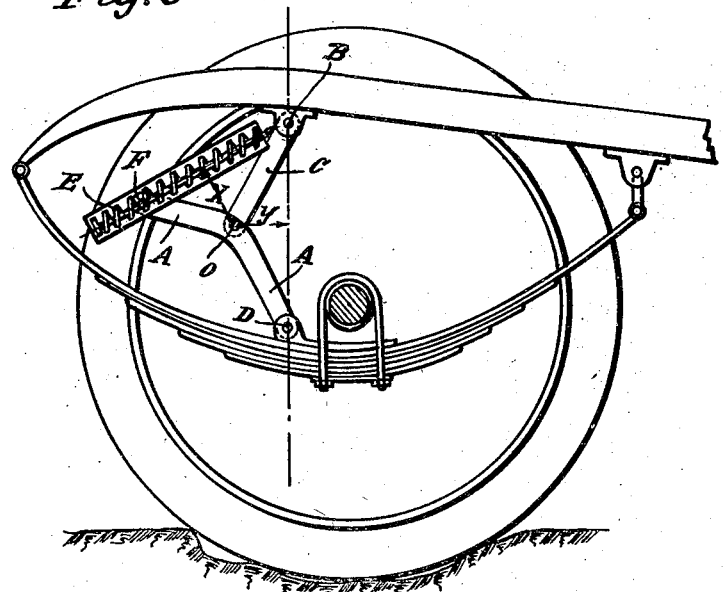
Figure 4:
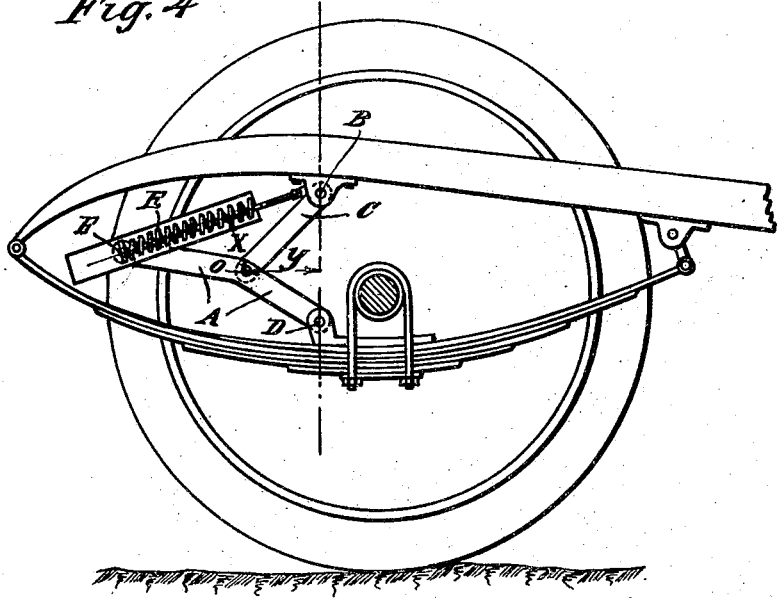

In Figs. 3 and 4 a modification is shown for cases in which the available space between the vehicle springs and the frame is small.

According to this modification the double lever arm or bell-crank lever A described with reference to Figs. 1 and 2 is pivoted at the end D to the axle and at O to simple arm C pivoted to the frame at B while, the other lever A instead of being pivoted to the end F of the case containing the coil spring E is pivoted to a point F near the said end, so that the said spring case by being more or less extended beyond the pivot may allow of a longer coil spring being used than that which would be allowed by the length of the single arm A such as in Figs. 1 and 2.

Owing to the said modification longer coil springs may be used than those allowed by the length of arm A, and therefore less sensitive springs may be used as regards the said force produced with respect to the angular movements of the lever arms.

As a matter of fact, with the increase of the initial length of the spring used, for an equal length of compression the variation of the force generated by the spring owing to the movement of the lever arms produced by the movements of the axle, is diminished.

As a consequence the variations of the supporting force of the spring and lever device come always nearer to the variation of the ratio $\frac{X}{Y}$ of the lever arms only, thereby always becoming more rapid, so that the variations of the supporting force occurring in the vehicle springs M may be more rapidly compensated, the said variations being produced very rapidly also by very slight movements of the axle.

Having now particularly described and ascertained my said invention and the manner in which the same is to be performed, what I claim and desire to secure by Letters Patent is:

1. In a shock preventing device for vehicles in combination with a laminated spring, a frame, a pair of levers arranged between said spring and said frame, one of said levers being pivoted at one end to the frame, the other of said levers being pivoted to the laminated spring and to said first lever, spring means combined with said pair of levers and adapted to resiliently spread the two levers against approaching movements of the frame and the laminated spring.

2. In a shock preventing device for vehicles in combination with a frame, a semi-elliptical laminated spring, a pair of angle levers arranged between said spring and said frame, one of the levers being pivoted at one end to the frame, while the other angle lever is pivoted intermediate its ends to the semi-elliptical spring and one end pivoted to an intermediate point of the other angular lever, and a coiled spring connecting the free ends of the two levers and adapted to spread the other ends of the lever against the approaching movement of the laminated spring and frame.

3. In a shock preventing device in combination with a laminated semi-elliptical spring and a chassis which is carried by the spring, a pair of levers connected with said laminated spring and said chassis respectively, and with each other, one of said levers being a bell crank lever which is connected intermediate its ends with the free end of said other lever, one end of the bell crank lever being connected with a spring adapted to counter-act the approaching movement of the frame and spring.

4. In a shock preventing device for vehicles, in combination, a semi-elliptical spring, a frame, a lever pivoted at one end to the frame and at its other end to a casing, a coil spring disposed in said casing, a second lever pivoted to said semi-elliptical spring and to said first lever, and means connecting said second lever to said coiled spring.

In testimony whereof I have hereunto signed my name.

EUGENIO CANTONO.